E. W. CONRADI.
DOUBLE SEAMING CAN MACHINE.
APPLICATION FILED MAR. 31, 1910. RENEWED FEB. 26, 1913.
1,077,393.
Patented Nov. 4, 1913.
2 SHEETS—SHEET 1.
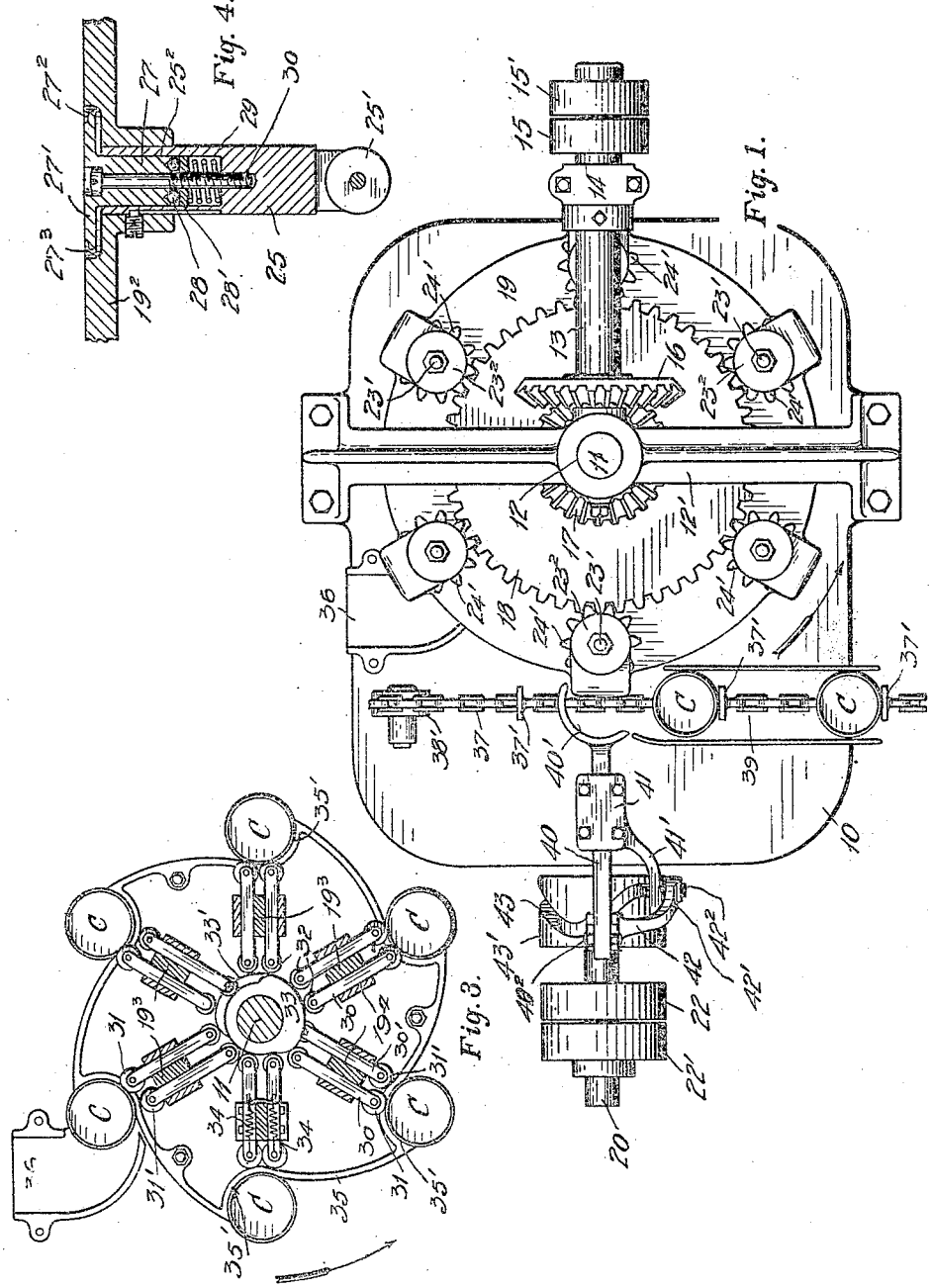
WITNESSES:
Horace Barnes.
Fred A. Cooke
INVENTOR
Edward W. Conradi
BY
Pierre Barnes
ATTORNEY

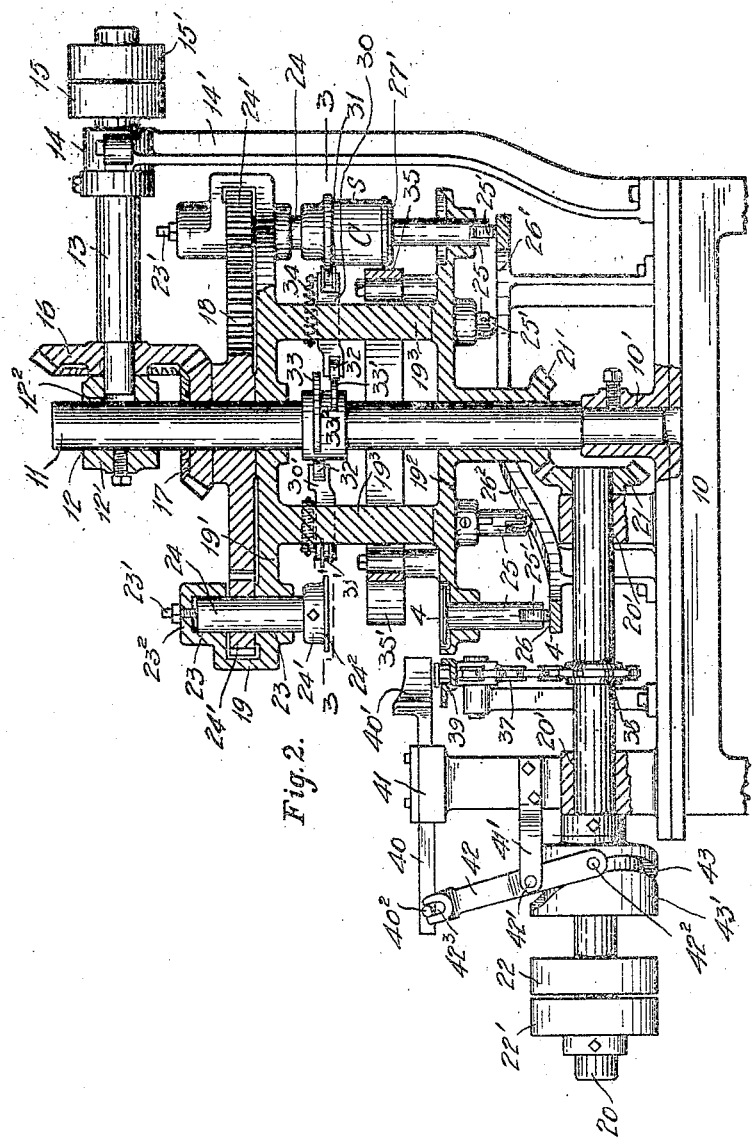

UNITED STATES PATENT OFFICE.

EDWARD W. CONRADI, OF SEATTLE, WASHINGTON.

DOUBLE-SEAMING CAN-MACHINE.

1,077,393.   Specification of Letters Patent.   Patented Nov. 4, 1913.

Application filed March 31, 1910, Serial No. 552,661. Renewed February 26, 1913. Serial No. 750,933.

*To all whom it may concern:*

Be it known that I, EDWARD W. CONRADI, a citizen of the United States, residing at Seattle, in the county of King and State of Washington, have invented certain new and useful Improvements in Double - Seaming Can-Machines, of which the following is a specification.

This invention relates to improvements in can capping machines; and the object of my improvements is the provision of means whereby the connecting of the caps and can bodies by what is known as double-seaming is facilitated and accomplished with great rapidity and at a minimum of cost.

The invention consists in a rotary frame carrying a plurality of members between which the can bodies and caps are clamped and then rotated while being acted upon by accompanying joint-forming devices.

The invention further consists in the novel construction, adaptation, and combination of parts, as will be hereinafter described and claimed.

In the drawings, Figure 1 is a plan view of a machine embodying my invention; Fig. 2 is a longitudinal vertical section of the same; Fig. 3 is a horizontal section taken through 3—3 of Fig. 2. Fig. 4 is an enlarged sectional view through 4—4 of Fig. 2; and Fig. 5 represents diagrammatically the various steps taken in forming a double seam with a machine such as is illustrated in the preceding views.

The reference numeral 10 designates a suitable base for the superposed parts of the machine frame and has a step bearing 10' for an upright non-rotatable shaft 11 which is supported near its upper end in a socket 12 of the frame member 12'.

13 is a horizontal shaft which is journaled in a socket 12² of said member and also in a bearing box 14 provided upon the frame member 14'. Shaft 13 is driven continuously during the operation of the machine by a belt leading from a suitable power motor and passing around a pulley 15 fixedly mounted upon the shaft, while a loose pulley 15' is provided to accommodate the driving belt when the machine is to be made inoperative.

16 is a beveled pinion carried by the shaft 13 and meshes with a gear wheel 17 which is formed with, or rigidly connected to, a spur wheel 18 which is rotatably mounted upon the shaft 11.

19 is a frame, or carrier, as it will be hereinafter denominated, which is also rotatable upon the shaft and is adapted to be driven from a horizontal shaft 20 through the medium of a bevel pinion 21 upon the latter meshing with bevel gear wheel 21' formed upon, or rigidly connected with, said carrier. The shaft 20 is journaled in suitable bearings, such as 20', and is provided with a tight and a loose pulley 22 and 22', respectively, for a power belt which rotates the shaft and the parts of the machine deriving their motions therefrom.

The carrier 19 is formed with an upper platform 19' and a lower platform 19² which are separated to afford space for the various elements of the machine which serve most immediately to effect the double seaming operations. Mounted in bearings such as 23 in the upper platform of the carrier and in proximity of the periphery thereof are vertical spindles 24 which are rotated in unison from the spur wheel 18 engaging the gear wheels 24' which are fixedly connected with the respective spindles. These spindles are movable longitudinally for adjustment purposes or to compensate for wear, the take up for which is accomplished by thrust screws 23' which extend through the bearing ends 23² provided therefor. In the lower of said carrier platforms is a series of vertical mandrels 25 corresponding in number and disposed to be in axial alinement with the spindles 24, that is to say, in pairs severally comprised of an upper spindle and a lower mandrel. Such mandrels are desirably non-rotatable but support spindles 27 which are rotated by the spindles thereabove and through the services of the cans which are clamped therebetween. The mandrels are, however, arranged to be successively raised to effect such can-clamping function and then maintained in such condition while the seaming operations are being performed whereupon the mandrels are successively receded to release the cans. These actions for engaging and disengaging the cans are attained by providing at the lower ends of the respective mandrels rollers 25' which travel upon a circular track having diametrically opposite portions 26 and 26' arranged in different horizontal planes and with connecting, inclined intermediate portions 26². Each of the above referred to spindles, see Fig. 4, is seated in socket 25² of the respective mandrels and is supported from below by anti-friction end bearings consisting preferably of balls 28 and a disk 28'; the latter being itself yieldingly supported by a compression spring 29 whose extension is limited by a bolt 30 secured to the mandrel. Integral with the spindles 27 are enlarged heads 27' having circumferential rabbets 27² to allow of the central portion of the heads entering the recesses in the bottom ends of the cans or, where the cans are unprovided with such ends, the bottom edges of the circular bodies of the cans would be borne upon the peripheral flanges 27³ of the heads. The top spindles 24 carry upon their lower ends collars 24³ which, as illustrated, are provided at the bottom with peripheral flanges 24² of diameters to allow of their entering the recesses of the can ends. The upper and lower of said carrier platforms are connected by standards 19³ located in the radial planes of the said spindles. Slidably seated in slots 19⁴ upon the opposite sides of each of the standards are bars 30 and 30' which carry former-wheels 31 and 31' at their outer ends and traction rolls 32 at their inner ends. These rollers are disposed in two horizontal planes and those which are disposed in the upper plane are adapted to track against a cam element 33, while the others, track against a cam element 33'. Both of these elements 33 and 33' are stationary and are desirably formed upon a sleeve 33² which is rigid with the shaft 11. Said bars are individually connected by springs, such as 34, with said standards, see Fig. 3, to yieldingly hold the rolls thereof against the respective cam elements or the sleeve, as the case may be.

35 represents a feed-wheel connected with the carrier so as to rotate therewith and is provided with a series of pockets 35' which are disposed to receive the cans as they are supplied to the carrier and retain them in positions to be clamped by the before described devices and also convey the same to a discharge spout 36 of the machine frame after the cans have been released by such clamping devices.

37 is an endless conveyer chain passing about a driving sprocket wheel 38 upon the shaft 20 and thence about guide-wheels such as 38' so as to have a portion of the chain lead from a bench, not shown, through a transversely arranged trough 39, see Fig. 2, provided upon the machine frame and disposed at an elevation so that the top of the chain will be slightly higher than the top of the carrier platform 19². Spaced at suitable distances apart along said chain are link-attachments 37' which serve to drag the cans from the said bench to a reciprocating can feeder which transposes the cans, as C, one by one from the chain to the carrier as the latter revolves in the progress of the work. More particularly the feeder comprises a bar 40 mounted in a guide-support 41 of the machine frame so as to be reciprocated in directions radially of the axis of the carrier 19 and at the end adjacent thereto it is provided with a concavity 40' in which the cans are seated while being transferred from the chain as aforesaid. Intermittent motion is imparted to the feeder-bar by a lever 42, fulcrumed at 42' to an arm 41' of the support 41 and receiving vibratory motion from suitable devices upon the shaft 20, such as by a stud 42² upon one of the lever arms projecting into a cam-slot 43 of a drum 43' upon the said shaft; while the other arm of the lever is bifurcated, as at 42³, to straddle a pin 40² extending through the feeder-bar.

In explaining the operation of the invention I will, for clearness, designate the circular walls of the cans as the "shells" s. These shells are, previously to the operations herein contemplated, formed with marginal flanges as at f in Fig. 5. The can ends e are each similarly formed with a peripheral flange g about the shoulder h of a depressed central portion k. Such shells with the end thereupon, as at A in Fig. 5, are now placed by an attendant upon the moving chain 37 which conveys them in such condition to the feeding bar 40 by which they are transferred to the rotating carrier of the machine. The work thus presented is received in the revolving pockets 35' of the feed-wheel 35 and carried thereby in the direction indicated by the arrows in Figs. 1 and 3, the strokes of the feeding-bar being timed to insure each such pocket being thus charged.

As the carrier 19 rotates, the mandrels 25 are successively raised through the office of the track 26—26' thereby elevating the can-parts and bringing the ends e which are uppermost into position to receive the heads 24⁴ of the upper spindles 24 and cause them to forcibly enter the depressions k of such ends. When this ensues and through the rotation transmitted to these spindles through the medium of the rotating spur-wheel 18 acting upon the gear-wheels 24' accelerated by the motion derived through the rotation of the carrier 19 causes the work to be clamped between the several pairs of spindles 24 and 27 spinning at a high velocity.

As the clamped cans are carried about their orbital, the former-wheels 31 first act through the rolls 32 thereof being controlled by the cam 33 to turn the flanges g of the ends e over the edges of the shell flanges f, as represented progressively in B and C of Fig. 5. The continued action of these former-wheels accomplishes the curling of the flanges f and g to occupy the relative positions in which they are shown in D of the view when the work of the former-wheels 31 ceases. The other former-wheels 31' are thereupon caused by the controlling rolls 32 and the agency of the cam 33' to act to compact the folds thus imparted by the other former-wheels and thereby complete the double-seaming operations.

The afore described actions of the machine in accomplishing the forming and compacting of the can-seams are, as will be apparent, while the mandrels 25 are passing over the elevated portion 26' of the track and when the cans are in clamped condition. After this the mandrels recede by traveling down to the lower level 26 of the track to allow the cans to fall from their engagement with the heads 24⁴ of the upper spindles. When this occurs the cans are carried by the feed-wheel 35 until delivered into the discharge spout 36, thus completing a cycle of the machine's operations.

In uniting the can-shells with both ends, the same would be run through the machine twice, once for each of the respective ends and with the ends which are being acted upon uppermost.

From the foregoing it is seen that the can-parts, that is, the shells, or bodies and an end therefor for each such shell are delivered to and then revolved with the respective pairs of spindles and while so carried the joints between such parts are formed through the coöperation of pairs of forming-wheels which revolve coincidently with the respective pairs of spindles.

The principal advantage of the invention is the facility with which the double-seaming of cans is accomplished with a uniform character in the work produced. A still further advantage is in the low cost of constructing the machine of this nature and in the low cost with which it can be operated.

What I claim is,—

1. In a machine of the character described, comprising an upright non-rotatable shaft, a frame rotatably mounted upon the shaft and formed with upper and lower platforms, means for effecting the rotation of said frame, a feed-wheel mounted with said frame, a circular non-rotative cam track, a plurality of mandrels mounted in the lower of the frame-platforms and severally provided with a roller upon their lower ends to travel upon said track, a spindle mounted for rotation in each of said mandrels and severally provided with an enlarged head, spindles mounted for rotation in the upper of said platforms and severally provided with enlarged heads at their lower ends, a toothed gear wheel fixedly mounted upon the last named spindles, a driving gear-wheel meshing with all of the aforesaid gear-wheels, means for rotating the said driving wheel, slidable bars revoluble with said frame, a former-wheel upon the outer end of each of said bars, a reciprocating feed-bar supplying to said frame the cans to be operated upon, and means for supplying such cans to said feed-bar.

2. A machine of the class described comprising an upright non-rotative shaft, a frame rotatably mounted upon the shaft and formed with upper and lower platforms, means for effecting the rotation of said frame, a feed-wheel mounted with said frame, a circular non-rotative cam track, a plurality of mandrels mounted in the lower of the frame-platforms and severally provided with a roller upon their lower ends to travel upon said track, a spindle mounted for rotation in each of said mandrels and severally provided with an enlarged head, spindles mounted for rotation in the upper of said platforms and severally provided with enlarged heads at their lower ends, means for effecting the rotation of the last named spindles, slidable bars revoluble with said frame, a former-wheel upon the outer end of each of said bars, means for effecting the reciprocation of said bars to actuate said former-wheels, a reciprocating feed-bar for supplying to said frame the cans to be operated upon, means comprising a vibratory lever and a cam-drum for causing the reciprocation of the feed-bar, a carrier chain for supplying such cans to said feed-bar, and means for driving said chain.

3. A machine of the character described comprising an upright non-rotatable shaft, a frame rotatably mounted upon the shaft and formed with upper and lower platforms, means for effecting the rotation of said frame, a feed-wheel mounted with said frame, a circular non-rotative cam-track, a plurality of mandrels mounted in the lower of the frame-platforms and severally provided with a roller upon their lower ends to travel upon said track, a spindle mounted for rotation in each of said mandrels and severally provided with an enlarged head, spindles mounted for rotation in the upper of said platforms and severally provided with enlarged heads at their lower ends, means for effecting the rotation of the last named spindles, two cams fixedly mounted upon said upright shaft, slidable bars revoluble with said frame, a roller for each of said bars and arranged to engage with said cams, a retractile spring for each of said bars and adapted to maintain said rollers in position for engagement with the respective cams, a former-wheel upon the outer end of each of said bars, a reciprocating feed-bar for supplying to said frame the cans to be operated upon, and means for supplying such cans to said feed-bar.

4. A machine of the character described comprising an upright non-rotatable shaft, a frame rotatably mounted upon the shaft and formed with an upper and a lower platform, means for effecting the rotation of said frame, a feed-wheel mounted with said frame, a plurality of mandrels mounted in the lower of the frame-platforms, means for effecting the vertical reciprocation of said mandrels, a spindle mounted for rotation in each of said mandrels and severally provided with an enlarged head, spindles mounted for rotation in the upper of said platforms and severally provided with enlarged heads at their lower ends, means for effecting the rotation of the last named spindles, two cams fixedly mounted upon said upright shaft, slidable bars revoluble with said frame, a roller for each of said bars and arranged to engage with said cams, a retractile spring for each of said bars and adapted to maintain said rollers in position for engagement with the respective cams, a former-wheel upon the outer end of each of said bars, a reciprocating feed-bar for supplying to said frame the cans to be operated upon, means comprising a vibratory lever and a cam-drum for causing the reciprocation of the feed-bar, a carrier chain for supplying such cans to said feed-bar, and means for driving said chain.

5. A machine of the character described comprising an upright non-rotatable shaft, a frame rotatably mounted upon the shaft and formed with an upper and a lower platform, means for effecting the rotation of said frame, a feed-wheel mounted with said frame, a plurality of mandrels mounted in the lower of the frame-platforms, means for effecting the vertical reciprocation of said mandrels, a spindle mounted for rotation in each of said mandrels and severally provided with an enlarged head, spindles mounted for rotation in the upper of said platforms and severally provided with enlarged heads at their lower ends, a toothed gear-wheel fixedly mounted upon the last named spindles, a driving gear-wheel meshing with all of the aforesaid gear-wheels, means for rotating the said driving wheel, slidable bars revoluble with said frame, a former-wheel upon the outer end of each of said bars, means for effecting the reciprocation of said bars to actuate said former-wheels, a reciprocating feed-bar for supplying to said frame the cans to be operated upon, means comprising a vibratory lever and a cam-drum for causing the reciprocation of the feed-bar, a carrier chain for supplying such cans to said feed-bar, and means for driving said chain.

6. A machine of the character described comprising an upright non-rotatable shaft, a frame rotatably mounted upon the shaft and formed with an upper and a lower platform, means for effecting the rotation of said frame, a feed-wheel mounted with said frame, a plurality of mandrels mounted in the lower of the frame-platforms, means for effecting the vertical reciprocation of said mandrels, a spindle mounted for rotation in each of said mandrels and severally provided with an enlarged head, spindles mounted for rotation in the upper of said platforms and severally provided with enlarged heads at their lower ends, a toothed gear-wheel fixedly mounted upon the last named spindles, a driving gear-wheel meshing with all of the aforesaid gear-wheels, means for rotating the said driving wheel, two cams fixedly mounted upon said upright shaft, slidable bars revoluble with said frame, a roller for each of said bars and arranged to engage with said cams, a retractile spring for each of said bars and adapted to maintain said rollers in position for engagement with the respective cams, a former-wheel upon the outer end of each of said bars, a reciprocating feed-bar for supplying to said frame the cans to be operated upon, and means for supplying such cans to said feed-bar.

7. A machine of the character described comprising an upright non-rotatable shaft, a frame rotatably mounted upon the shaft and formed with an upper and a lower platform, means for effecting the rotation of said frame, a feed-wheel provided with a plurality of cavities in its periphery and mounted to rotate with said frame, a circular non-rotatable cam-track, a plurality of mandrels mounted in the lower of the frame-platforms and severally provided with a roller upon their lower ends to travel upon said track, a spindle mounted for rotation in each of said mandrels and severally provided with an enlarged head, spindles mounted for rotation in the upper of said platforms and severally provided with enlarged heads at their lower ends, means for effecting the rotation of the last named spindles, two cams fixedly mounted upon said upright shaft, slidable bars revoluble with said frame, a roller for each of said bars and arranged to engage with said cams, a retractile spring for each of said bars and adapted to maintain said rollers in position for engagement with the respective cams, a former-wheel upon the outer end of each of said bars, a reciprocal feed-bar for supplying to said frame the cans to be operated upon, means comprising a vibratory lever and a cam-drum for causing the reciprocation of the feed-bar, a carrier chain for supplying such cans to said feed-bar, and means for driving said chain.

8. A machine of the character described comprising an upright non-rotatable shaft, a frame rotatably mounted upon the shaft and formed with an upper and a lower platform, means for effecting the rotation of said frame, a feed-wheel provided with a plurality of cavities in its periphery and mounted to rotate with said frame, a circular non-rotatable cam-track, a plurality of mandrels mounted in the lower of the frame-platforms and severally provided with a roller upon their lower ends to travel upon said track, a spindle mounted for rotation in each of said mandrels and severally provided with an enlarged head, spindles mounted for rotation in the upper of said platforms and severally provided with an enlarged head at their lower ends, a toothed gear wheel fixedly mounted upon the last named spindles, a driving gear-wheel meshing with all of the aforesaid gear-wheels, means for rotating the said driving wheel, two cams fixedly mounted upon said upright shaft, slidable bars revoluble with said frame, a roller for each of said bars and arranged to engage with said cams, a retractile spring for each of said bars and adapted to maintain said rollers in position for engagement with the respective cams, a former-wheel upon the outer end of each of said bars, a reciprocating feed-bar for supplying to said frame the cans to be operated upon, and means for supplying such cans to said feed-bar.

9. A machine of the class described, comprising an upright non-rotatable shaft, a frame rotatably mounted upon the shaft and formed with an upper and a lower platform, means for effecting the rotation of said frame, a feed-wheel provided with a plurality of cavities in its periphery and mounted to rotate with said frame, a circular non-rotatable cam-track, a plurality of mandrels mounted in the lower of the frame-platforms and severally provided with a roller upon their lower ends to travel upon said track, a spindle mounted for rotation in each of said mandrels and severally provided with an enlarged head, spindles mounted for rotation in the upper of said platforms and severally provided with enlarged heads at their lower ends, a toothed gear-wheel fixedly mounted upon the last named spindles, a driving gear-wheel meshing with all of the aforesaid gear wheels, means for rotating the said driving wheel, slidable bars revoluble with said frame, a former-wheel upon the outer end of each of the bars, means for effecting the reciprocation of said bars to actuate said former-wheels, a reciprocating feed-bar for supplying to the frame the cans to be operated upon, means comprising a vibratory lever and a cam-drum for causing the reciprocation of the feed bar, a carrier chain for supplying such cans to said feed-bar, and means for driving said chain.

10. A machine of the class described comprising an upright non-rotatable shaft, a frame rotatably mounted upon the shaft and formed with an upper and a lower platform, means for effecting the rotation of said frame, a feed-wheel provided with a purality of cavities in its periphery and mounted to rotate with said frame, a plurality of mandrels mounted in the lower of the frame-platforms, means to effect the vertical reciprocation of said mandrels, a spindle mounted for rotation in each of said mandrels and severally provided with an enlarged head, spindles mounted for rotation in the upper of said plaforms and severally provided with enlarged heads at their lower ends, a toothed gear-wheel fixedly mounted upon the last named spindles, a driving gear-wheel meshing with all of the aforesaid gear-wheels, means for rotating said driving wheel, two cams fixedly mounted upon said upright shaft, slidable bars revoluble with said frame, a roller for each of said bars and arranged to engage with said cams, a retractile spring for each of said bars and adapted to maintain said rollers in position for engagement with the respective cams, a former-wheel upon the outer end of each of said bars, a reciprocating feed-bar for supplying to said frame the cans to be operated upon, means comprising a vibratory lever and a cam-drum for causing the reciprocation of the feed-bar, a carrier chain for supplying such cans to said feed-bar, and means for driving said chain.

11. A machine of the class described comprising an upright non-rotatable shaft, a frame rotatably mounted upon the shaft and formed with an upper and a lower platform, means for effecting the rotation of said frame, a feed-wheel provided with a plurality of cavities in its periphery and mounted to rotate with said frame, a circular non-rotative cam-track, a plurality of mandrels mounted in the lower of the frame-platforms and severally provided with a roller upon their lower ends to travel upon said track, a spindle mounted for rotation in each of said mandrels and severally provided with an enlarged head, spindles mounted for rotation in the upper of said platforms and severally provided with enlarged heads at their lower ends, a toothed gear-wheel fixedly mounted upon the last named spindles, a driving gear-wheel meshing with all of the aforesaid gear wheels, means for rotating the said driving wheel, two cams fixedly mounted upon said upright shaft, slidable bars revoluble with said frame, a roller for each of said bars and arranged to engage with said cams, a retractile spring for each of said bars and adapted to maintain said rollers in position for engagement with the respective cams, a former-wheel upon the outer end of each of said bars, a reciprocating feed-bar for supplying to the frame the cans to be operated upon, means comprising a vibratory lever and a cam-drum for causing the reciprocation of the feed-bar, a carrier chain for supplying such cans to said feed-bar, and means for driving said chain.

12. In a machine of the character described, the combination with a rotatable frame, and a stationary cam-track, of a series of mandrels revolubly carried by said frame and receiving vertical movements from said track, rotary non-reciprocating spindles carried by the frame, mechanism for effecting the rotation of said spindles, spindles rotatably mounted in the respective mandrels, former-wheels mounted for reciprocation in the frame, means for effecting the reciprocating movements of said wheels, and a feed-wheel mounted for rotation with said frame.

13. In a machine of the character described, the combination with a rotatable frame, and a stationary cam-track, of a series of mandrels revolubly carried by said frame and receiving vertical movements from said track, rotary non-reciprocating spindles carried by the frame, mechanism for effecting the rotation of said spindles, spindles rotatably mounted in the respective mandrels, former-wheels mounted for reciprocation in the frame, positive means for effecting the outward movements of said former-wheels, springs for effecting the retractile movements of the wheels, and means for feeding the work to the aforesaid spindles.

EDWARD W. CONRADI.

Witnesses:
H. BARNES,
W. N. WILLIAMS.